United States Patent
Nascimento et al.

(10) Patent No.: US 7,688,113 B2
(45) Date of Patent: Mar. 30, 2010

(54) CURRENT DRIVER SUITABLE FOR USE IN A SHARED BUS ENVIRONMENT

(75) Inventors: Ivan Carlos Ribeiro Nascimento, Campinas (BR); Walter Luis L. Tercariol, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/059,906

(22) Filed: Mar. 31, 2008

(65) Prior Publication Data
US 2009/0243655 A1  Oct. 1, 2009

(51) Int. Cl.
*H03K 19/08* (2006.01)
(52) U.S. Cl. .................. 326/82; 326/83; 327/108
(58) Field of Classification Search ............ 326/82, 326/83, 86, 90, 56, 57, 127; 327/129, 108, 327/109, 170
See application file for complete search history.

(56) References Cited

U.S. PATENT DOCUMENTS

| 5,268,847 A | 12/1993 | Potetz et al. |
| 5,872,474 A * | 2/1999 | Kagomiya et al. .......... 327/130 |
| 2004/0141560 A1 | 7/2004 | Koyasu |
| 2006/0017474 A1 | 1/2006 | Sicard |
| 2006/0152261 A1 | 7/2006 | Lance |

FOREIGN PATENT DOCUMENTS

EP  1435712 A1  7/2004

* cited by examiner

*Primary Examiner*—Daniel D Chang
(74) *Attorney, Agent, or Firm*—Jackson Walker L.L.P.

(57) ABSTRACT

A transceiver suitable for interfacing a logic device to a shared bus includes a transmit node that receives an input signal from the logic device and an I/O node, that is coupled to the shared bus. The transceiver may be designed for use with a shared-bus, single master, multiple slave architecture, e.g., a Local Interconnect Network (LIN). In a LIN compliant implementation, the transceiver may be suitable for use in at least some types of automobiles and other motorized vehicles. Control logic coupled to the transmit node may assert a current driver enable signal in response to detecting an assertion of the input signal. A current driver of the transceiver is configured to draw a time varying driver current from the shared bus node after detecting an assertion of the current driver enable signal. The driver current may cause a sinusoidal transition of the shared bus voltage.

15 Claims, 8 Drawing Sheets

| Nodes | Ires | Icap | Req | Ceq |
|---|---|---|---|---|
|  | uA | uA | Ohms | nF |
| 2 | 200 | 12.5 | 1250 | 0.4 |
| 2 | 225 | 12.5 | 1111 | 0.4 |
| 2 | 250 | 25 | 1000 | 0.7 |
| 3 | 275 | 50 | 909 | 1.4 |
| 6 | 300 | 75 | 833 | 2.1 |
| 10 | 325 | 100 | 769 | 2.9 |
| 14 | 350 | 150 | 714 | 4.3 |
| 17 | 375 | 175 | 667 | 5.0 |
| 20 | 400 | 200 | 625 | 5.7 |
| 24 | 450 | 225 | 556 | 6.4 |
| 28 | 500 | 250 | 500 | 7.1 |
| 40 | 600 | 350 | 417 | 10.0 |

CURRENT DRIVER SUITABLE FOR USE IN A SHARED BUS ENVIRONMENT

BACKGROUND

1. Field

The disclosed subject matter is in the field of communication networks and, more particularly, communication networks for use in automobiles and similar applications.

2. Related Art

The local interconnect network (LIN) is a universal asynchronous receiver-transmitter (UART)-based, single-master, multiple-slave serial bus architecture originally developed for automotive sensor and actuator networking applications. The LIN Standard, which specifies various layers, formatting, and interface aspects of the network, is maintained by and available from the LIN Consortium. LIN provides a cost-effective option for connecting motors, switches, sensors and lamps in an automobile or other type of motorized vehicle. A LIN master node may extend the communication benefits of in-vehicle networking to individual sensors and actuators by connecting LIN with higher-level networks, such as a controller area network (CAN). LIN was not designed as a high speed bus and evolving standards have imposed challenging requirements for LIN bus implementations.

BRIEF DESCRIPTION OF THE DRAWINGS

The present invention is illustrated by way of example and is not limited by the accompanying figures, in which like references indicate similar elements. Elements in the figures are illustrated for simplicity and clarity and are not necessarily drawn to scale.

DETAILED DESCRIPTION

In one aspect, a disclosed transceiver that is suitable for interfacing a logic device to a shared bus includes a transmit node that receives an input signal from the logic device and an I/O node, also referred to herein as the shared bus node, that connects to the shared bus. The transceiver is suitable for use with a single master, multiple slave serial bus. The transceiver may be implemented, for example, as a Local Interconnect Network (LIN) compliant transceiver for use in at least some types of automobiles or other motorized vehicles.

Control logic coupled to the transmit node may assert a current driver enable signal in response to detecting an assertion of the input signal. A current driver of the transceiver is configured to draw a time varying driver current from the shared bus node in response to an assertion of the current driver enable signal. The driver current causes a transition of the shared bus voltage. The transition approximates at least a portion of a sinusoidal signal and may be characterized as a wave shaped transition. As an approximate of at least a part of a sinusoidal signal, some embodiments of the wave shape transition include one or a very limited number of frequency components that are substantial in magnitude and zero or more frequency components that are "insubstantial" in magnitude, e.g., having magnitudes at least an order of magnitude less than the magnitudes of the substantial frequency components.

In some embodiments, the current driver is designed to draw a driver current that would result if a voltage signal having a sinusoidal transition from a recessive state to an asserted state were applied to an idealized model of the shared bus. For example, the shared bus might be modeled as having a characteristic impedance including a characteristic resistance and a characteristic capacitance. The characteristic impedance might depend on the number of nodes connected to the shared bus. The current driver may be configured to draw a driver current that includes a resistive component approximating a current attributable to the characteristic resistance and a capacitive component approximating a current attributable to the characteristic capacitance.

The current driver may include a resistive block that draws the resistive component and a capacitive block that draws the capacitive component of the driver current. The resistive block and the capacitive block may each be designed with a plurality of current mirrors arranged in parallel, e.g., arranged with one current terminal coupled to the shared bus node. In these embodiments, at least some of the current mirrors may include an analog biased transistor having a control terminal and a pair of current terminals and a switching transistor having a control terminal and a pair of current terminals. The current mirror(s) may be configured to draw a reference current through the analog biased transistor current terminals. A magnitude of the reference current is determined at least in part by the magnitude of a bias signal applied to the analog biased transistor control terminal. The switching transistor also includes a control terminal and a pair of current terminals. The current terminals of the analog biased transistor may be arranged in series with the current terminals of the switching transistor. In this configuration, the current mirror draws a current determined by the bias signal when a control signal applied to the control terminal of the switching transistor is asserted.

The transceiver may include control logic that provides the control signals that manipulates the current mirror control terminals, e.g., the control terminals of the switching transistors in the resistive block and/or the capacitive block, according to a prescribed timing to simulate or approximate the resistive and/or capacitive component(s) of the driver current. In some embodiments, the current mirror analog biased transistors are of varying sizes to produce a precisely specified driver current when the current mirrors switches are turn on in a prescribed manner. In one embodiment, for example, the current mirrors in the resistive block are turned on sequentially to produce a resistive component of the driver current that increases in magnitude as each successive current mirror switch is turned on. The capacitive component of the driver current may increase from a minimum value, e.g., zero, to a maximum value at or near a midpoint of the LIN waveform transition and then decrease back to the minimum value. In these embodiments, the current mirrors in the capacitive block may be turned on sequentially until all the current mirrors are conducting at or near the transition midpoint and then sequentially turned off in reverse order so that the capacitive component decreases back to zero.

The transceiver's current driver may include, in addition to the resistive and capacitive blocks, a third block, referred to herein as the Rds(on) block. The Rds(on) block may be configured to draw the driver current during conditions under which current mirrors in the resistive and/or capacitive blocks are not ideally biased. When, for example, the shared bus voltage drops below a predetermined threshold, the current mirrors may not conduct sufficient current. In these embodiments, the Rds(on) block may be implemented with a set of transistor switches arranged in parallel to draw current from the shared bus node.

The transceiver may further include a bias module to provide one or more bias signals to the current driver. The bias signal(s) may determine, at least in part, a magnitude of the driver current. For example, in the previously described embodiments, where the current driver includes current mirrors, the bias module may provide the bias signal(s) to the control terminals of the analog biased transistors. The magnitude of the bias signal(s), in these embodiments, may vary to "speed up" or "slow down" the current mirrors to achieve a transition with a desirable slew time.

The transceiver may include logic to facilitate automated adjustment of the transition slew time. For example, the transceiver may include a slew time module to generate at least one slew signal that indicates a slew time for a transition of the shared bus voltage. The slew time module might control, for example, a pair of slew signals including a first signal that indicates a first point in the transition, e.g., a 70% point, and a second signal that indicates a second point in the transition, e.g., a 30% point. Convergence logic configured to receive the slew signals may determine or approximate the slew time and adjust the bias signal if the slew time differs from a predetermined value or falls outside of a predetermined range of values.

In another aspect, a disclosed current driver that is suitable for use in a transceiver coupled to a shared bus is emphasized. The shared bus may be modeled as an RC circuit having a characteristic impedance including a characteristic resistance (R) and a characteristic capacitance (C). The current driver may be coupled to an I/O node that connects to the shared bus. The current driver may be configured to draw a driver current from the I/O node to produce a transition of the shared bus voltage. In some embodiments, the transition approximates a portion of a sinusoidal signal or another suitable signal having a frequency composition or spectral signature with one or a very small (e.g., ten or less) number of substantial components.

Some embodiments of the current driver include a resistive block and a capacitive block. The resistive block draws a resistive component of the driver current and the capacitive block draws a capacitive component of the driver current. The resistive component approximates the current "through" the characteristic resistance of the shared bus that would result if a sinusoidal voltage signal were applied to the shared bus. Because of the linear relationship between current and voltage in a resistive circuit, the resistive component of the driver current may have a sinusoidal transition, at least during periods when the bus voltage is transitioning. The capacitive component of the driver current may be nonlinear with respect to the shared bus voltage transition. For example, the capacitive component may be a derivative of the shared bus voltage transition. If the transition begins at a local maximum of the sinusoid and terminates when the shared bus voltage reaches a local minimum, the capacitive component of the driver current may be approximately zero initially and increase to a maximum value at or near a midpoint of the transition before returning back to zero by the end of the transition.

The resistive block, the capacitive block, or both may be implemented with a set of current sources arranged in parallel. The sizing of the current sources may be controlled so that, when the current sources are activated sequentially, the current drawn increases in a manner that approximates the resistive and capacitive components as applicable. As indicated previously, the current sources may be implemented as current mirrors that include an analog biased transistor and a switching transistor.

In embodiments that employ current mirrors for the resistive and capacitive blocks, the current driver may include a third block that draws the driver current when the shared bus voltage drops below a predetermined threshold. When the shared bus voltage is low, the current mirrors, which are designed for operation in a saturated mode, may not achieve the desired current. In these embodiments, the third block may be implemented with a set of single-transistor switches arranged in parallel. The third block may draw all or a substantial portion of the driver current when the shared bus voltage is below the threshold.

In still another aspect, a disclosed apparatus includes a plurality of devices configured to communicate over a LIN-compliant shared bus (a LIN bus). At least one of the devices is a logic device coupled to the LIN bus by a LIN-compliant transceiver (a LIN transceiver). The LIN transceiver may be configured to receive an input signal from the logic device. The LIN transceiver may include a current driver coupled to the transceiver's LIN node, which is the node that connects to the LIN bus when the LIN transceiver operating. The current driver may draw a transition current from the LIN node in response to the transceiver detecting a transition of the input signal. In some embodiments, the transition current causes a wave shaped transition of the LIN node voltage. A frequency composition of the wave shaped transition may be limited to one substantial component or a small number of substantial components.

Figure 1:
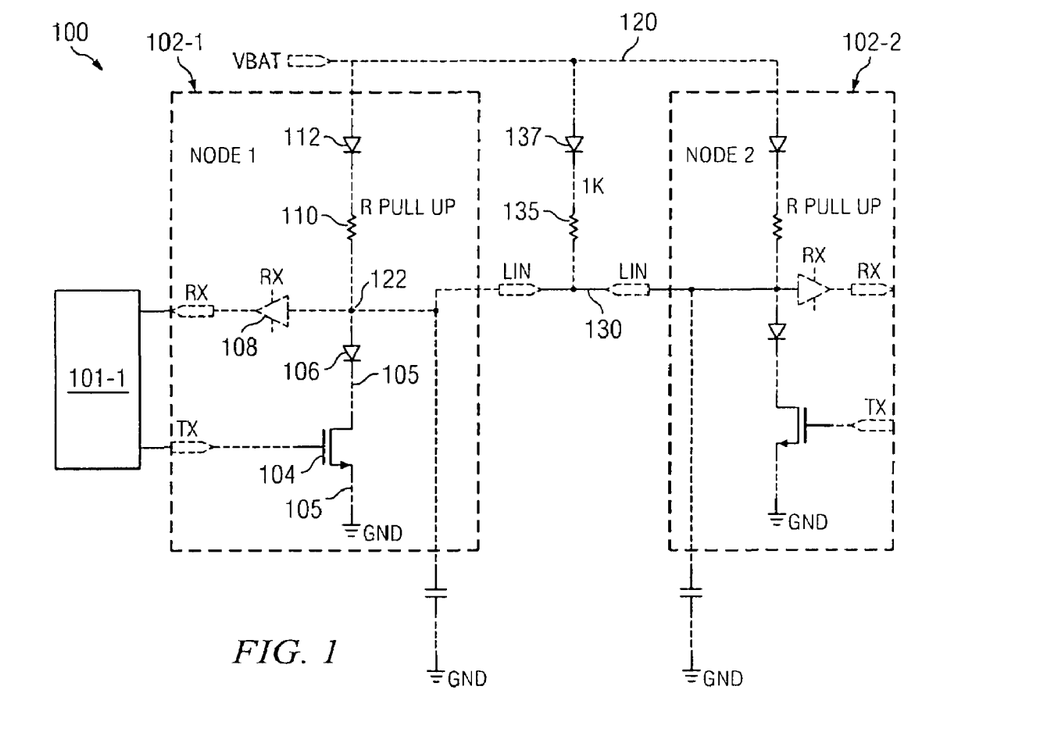
FIG. 1 is a block diagram of selected elements of a conventional LIN bus implementation.

Referring now to the drawings FIG. 1 depicts selected elements of a conventional two-node LIN-compliant network 100 (LIN 100). LIN 100 includes first node transceiver 102-1 and second node transceiver 102-2, each substantially similar in design, function, or both, coupled to a LIN-compliant shared bus (LIN bus) 130. First node transceiver 102-1 is supplied by a voltage (VBAT) produced by a vehicle's battery (not shown). First node transceiver 102-1 receives an input signal (TX) from and sends an output signal (RX) to a controller 101-1, which may be, for example, a microcontroller or a UART to which a sensor, actuator or suitable device is connected.

When controller 101-1 is sending information, controller 101-1 asserts the TX input to first node transceiver 102-1. Transceiver 102-1 responds to assertion of its TX input by driving its LIN node 122 to an asserted state of approximately 0 V, which drives LIN bus 130 to the asserted state as well. When controller 101-1 is receiving information, transceiver 102-1 senses its TX signal to determine the state of LIN bus 130.

Transceiver 102-1 as shown includes a transistor 104, a first diode 106, a comparator 108, a pull up resistor 110, and a second diode 112. Second diode 112 and pull up resistor 110 are connected in series as shown between the supply voltage VBAT and LIN node 122 with pull up resistor 110 being connected between LIN node 122 and a cathode of diode 112 and the anode of diode 112 connected to VBAT. Comparator 108 is connected to receive the signal applied to LIN node 122 as its input and produce the RX signal as its output. The TX signal drives the gate electrode of a transistor 104. The first diode 106 and the current terminals 105 of transistor 104 are connected in series between LIN node 122 and ground with the source pin of transistor 104 grounded, the drain pin of transistor 104 connected to the cathode of diode 106, and the anode of first diode 106 connected to LIN node 122. The configuration of second transceiver 102-2 is substantially similar.

As seen in FIG. 1, LIN node 122 is connected to LIN bus 130. LIN bus 130 as shown is pulled high in its recessive state via a pull up resistor 135 and a diode 137 connected in series between LIN bus 130 and VBAT signal 120. The voltage of LIN bus 130 is approximately equal to VBAT in its recessive state and close to ground in its dominant state. LIN 100 is a relatively low speed network with maximum data rates of approximately 20 kbps.

Although LIN was not designed as a high speed bus, evolving standards impose certain challenges on LIN bus implementations. These challenges include the ability to operate under RF aggression encompassing, as an example, the ability to communicate despite 36 dBm of DPI (Direct Power Injection) and as much as 200 mA of BCI (Bulk Current Injection). In addition, LIN bus 130 may be may be designed to exhibit a high impedance when there is loss of ground or a loss or low value of VBAT, operate with very low RF and conducted emission, have comprehensive testability, and comply with an 8000 V ESD requirement. Previous conventional LIN transceivers implementations, such as transceivers 102, were not optimized to address these requirements.

Figure 2:
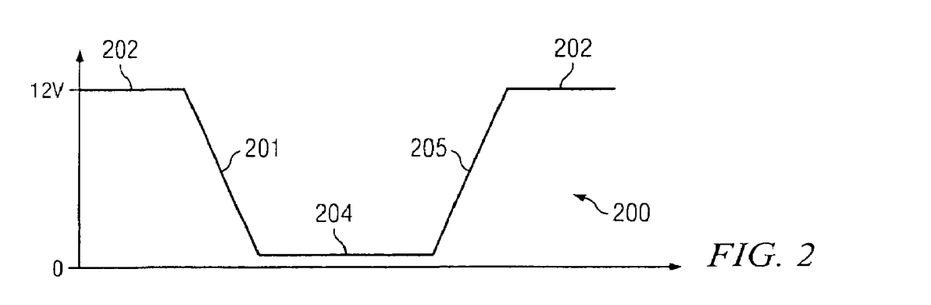
FIG. 2 illustrates a conventional signal used with the LIN bus depicted in FIG. 1.

Referring to FIG. 2, an exemplary wave form 200 generated by transceiver 102 as depicted in FIG. 1 is shown. Wave form 200 is characterized by a substantially linear and negatively sloped transition 201 from recessive state 202 to dominant state 204 and a relatively linear and positively sloped transition 205 from dominant state 204 to recessive state 202. It will be appreciated by those of ordinary skill in the field of communication signals that the frequency composition or spectral content of wave form 200 includes multiple components. It is undesirable from the perspective of minimizing RF emissions to generate spectrally rich signals.

Figure 3:
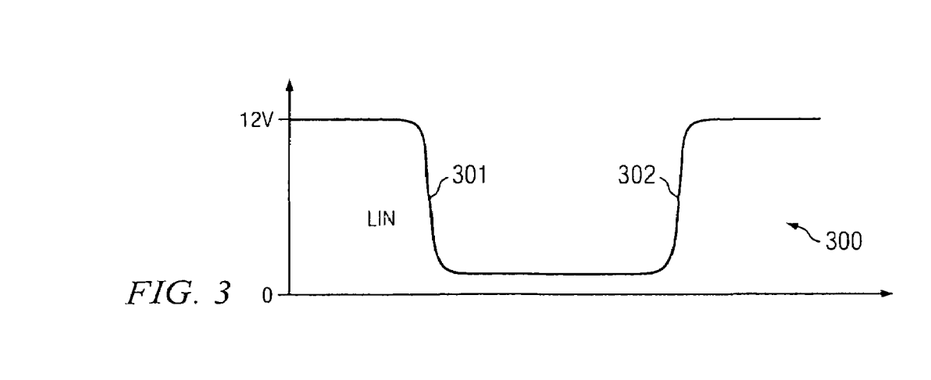
FIG. 3 illustrates an exemplary wave-shaped signal.

An embodiment of a transceiver described herein addresses unwanted RF emission by producing spectrally limited signal transitions. Referring to FIG. 3, one implementation of a disclosed transceiver, suitable for use in a LIN, is configured and operable to generate a waveform 300 in which a recessive-to-dominant transition 301, a dominant-to-recessive transition 302, or both, that approximate sinusoidal signals. As sinusoidal approximations, transitions 301 and 302 are both spectrally limited transitions. For purposes of this disclosure, the term spectrally limited transition refers to a signal transition with a frequency signature having just one substantial component or very few, e.g., less than ten, substantial components. By producing spectrally limited transitions, the described transceiver beneficially generates less emitted RF than a conventional LIN driver.

In some embodiments, a disclosed transceiver operable to produce waveform 300 as shown in FIG. 3 responds to a transition of a TX input from an MCU, UART, or other logic device by generating or otherwise causing a sinusoidal transition of the shared bus voltage from a recessive state to dominant state. In some embodiments, the transceiver includes a current driver that is controlled to draw precisely specified currents during precisely specified intervals. The currents drawn by the current driver approximate the currents that would be drawn from an idealized model of the shared bus. For example, if the shared bus is viewed as an RC circuit represented by a characteristic resistance R and a characteristic capacitance C, a transceiver may be configured to determine or approximate R and C based on the number of nodes connected to the shared bus. The transceiver's current driver may be configured to draw from the shared bus node a current that causes a desired transition of the shared bus voltage, i.e., a transition that approximates a sinusoidal signal.

Figure 4:
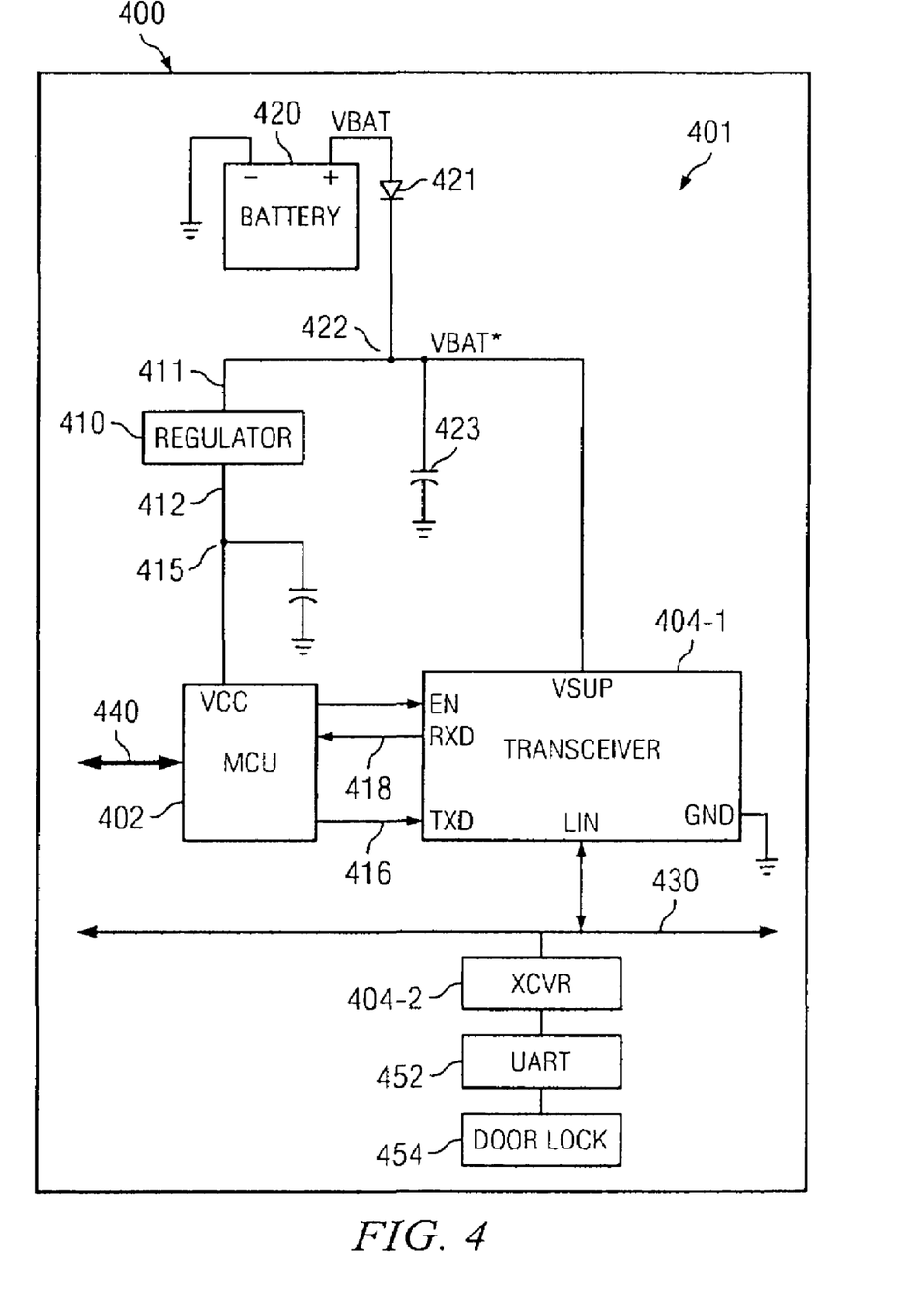
FIG. 4 is a block diagram of selected elements of an embodiment of a motorized vehicle apparatus emphasizing the implementation of a shared bus network within the apparatus.

Before describing embodiments of the transceiver itself, and referring to FIG. 4, a block diagram of selected elements of an embodiment of a motorized vehicle apparatus 400 is presented to illustrate aspects of a shared bus network 401 employed by apparatus 400. Shared bus network 401 may be implement as a LIN-compliant network in some embodiments. In the depicted embodiment, shared bus network 401 includes a microcontroller (MCU) 402, a transceiver 404, a voltage regulator 410, and a battery 420.

In some embodiments, battery 420 is a conventional 12V DC automobile battery that generates a voltage VBAT. The cathode of battery 420 is connected to the anode of a diode 421. The cathode of diode 421 is connected to a node, referred to herein as transceiver supply node 422. A shunt capacitor 423 connected to transceiver supply node 422 stabilizes the transceiver supply voltage. It will be appreciated that, under DC conditions or conditions approximating DC conditions, the transceiver supply voltage, i.e., the voltage of transceiver supply node 422 is approximately equal to the voltage produced by the battery 420. For this reason, the voltage at transceiver supply node 422 is referred to herein as VBAT*.

Regulator 410 as shown includes an input 411 connected to transceiver supply node 422 and an output 412 connected to MCU supply node 415. Regulator 410 may be implemented as a linear or switch-mode DC-to-DC converter. In the depicted embodiment, regulator 410 receives VBAT* as its input voltage and produces the supply voltage VCC for MCU 402. In some embodiments, VCC is a DC signal having a magnitude of approximately 5 V. In other embodiments, the magnitude of VCC may be higher or lower than 5 V.

MCU 402 may be exemplified by any of a variety of embedded microcontrollers. In the depicted embodiment, MCU 402 serves as a master node for shared bus 430. In such embodiments, MCU 402 may be implemented with any of various 8-bit microcontrollers distributed by Freescale Semiconductor including, for example, the S08 family of microcontrollers. In addition to supporting the LIN-compliant or other type of bus interface provided via transceiver 404, MCU 402 may support interfaces, not explicitly depicted, but represented generally by reference numeral 440, to other vehicle network busses including, for example, an interface to a CAN (controller area network) bus, as well as an interface to a general purpose serial interface such as SPI (serial peripheral interface). MCU 402 as depicted in FIG. 4, transmits TXD signal 416 to transceiver 404-1 and receives RXD signal 418 from transceiver 404-1.

In a LIN-compliant implementation, the node associated with transceiver 404-1 may be a LIN master node and the node associated with transceiver 404-2 may be a LIN slave node suitable for interfacing with low functioning hardware devices, e.g., a door lock, via a low level logic element such as a UART. Transceiver 404-2, as depicted in FIG. 4, is configured to connect to shared bus 430 to provide a shared bus interface for a UART 452 in communication with a door lock mechanism 454. In LIN-compliant embodiments of shared bus 430, transceivers 404-1 and 404-2 may be substantially similar in function, but with the inclusion of additional pull-up hardware for a transceiver, such as transceiver 404-1, associated with the master node.

Figure 5:
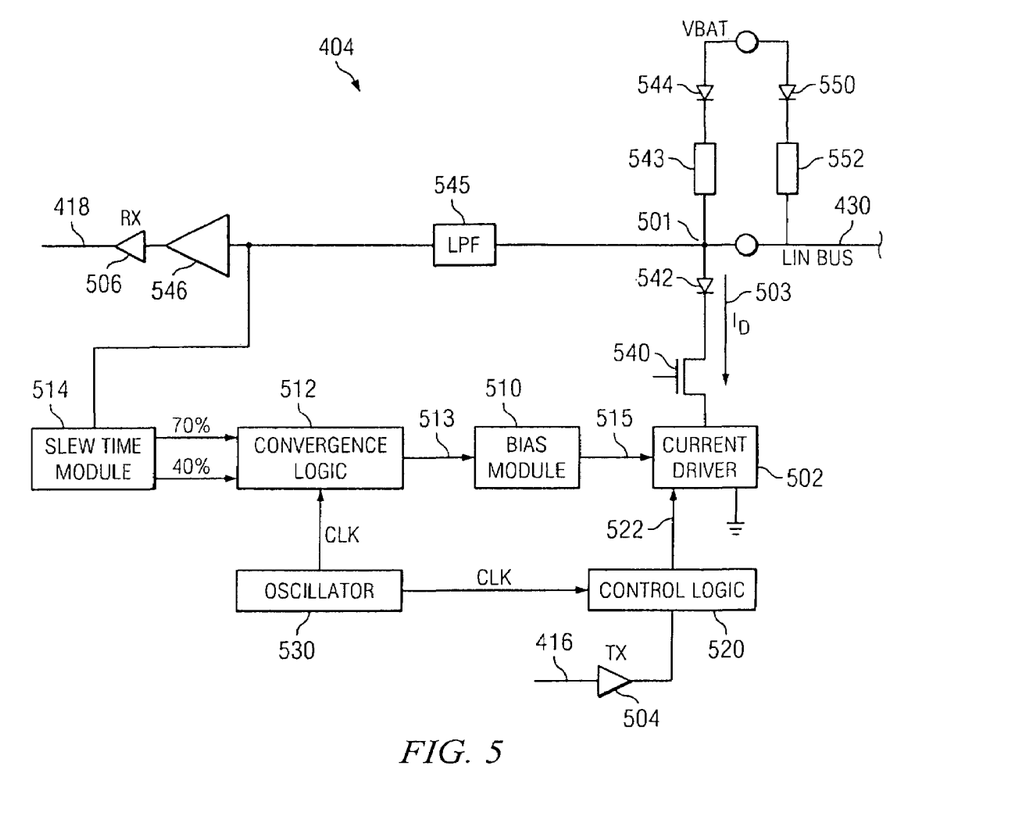
FIG. 5 is a block diagram of selected elements of an embodiment of a transceiver suitable for use in the apparatus of FIG. 4.

Turning now to FIG. 5, selected elements of an embodiment of a shared bus transceiver 404 are depicted. Transceiver 404 as shown includes features to enable reliable operation under considerable external RF aggression. In addition, transceiver 404 is configured to produce minimal RF emission. Transceiver 404 as shown is also compliant with 8K V ESD requirements and generates a shared bus signal that assumes a high impedance when ground is lost, VBAT is lost, or VBAT is low, i.e., has a magnitude that is less than a predetermined threshold value.

In the depicted embodiment, transceiver 404 includes a current driver 502, a bias module 510, convergence logic 512, a slew time module 514, control logic 520, and an oscillator 530. Transceiver 404 is operable to receive input signal 416 on a TX pin 504 and to drive output signal 418 on an RX pin 506. Transceiver 404 as shown includes a bi-directional I/O pin referred to herein as shared bus node 501. When transceiver 404 is installed or otherwise connected in the network 401, shared bus node 501 is connected to the shared bus 430.

In some embodiments, transceiver 404 is powered from the VBAT supply through a pull up termination including a series connected diode 544 and resistor 543. For LIN master nodes, the transceiver pull up hardware further includes resistor 552, which may be 1 KΩ) resistor in compliance with LIN specification 2.0. Resistor 552 as shown is connected in series with a diode 550 between VBAT and shared bus 430. For LIN slave node implementations, resistor 552 and diode 550 may be omitted.

Operationally, transceiver 404 responds to detecting an assertion of TX pin 504, by an MCU, UART, or other logic device, by causing a spectrally limited transition from a recessive voltage to an asserted voltage of shared bus 430. In some LIN-compliant implementations, the recessive voltage may be 5 V and the dominant voltage may be 0 V. The spectrally limited transitions produced by transceiver 404 beneficially conserve the amount of emitted RF that the transceiver emits.

Figure 6:
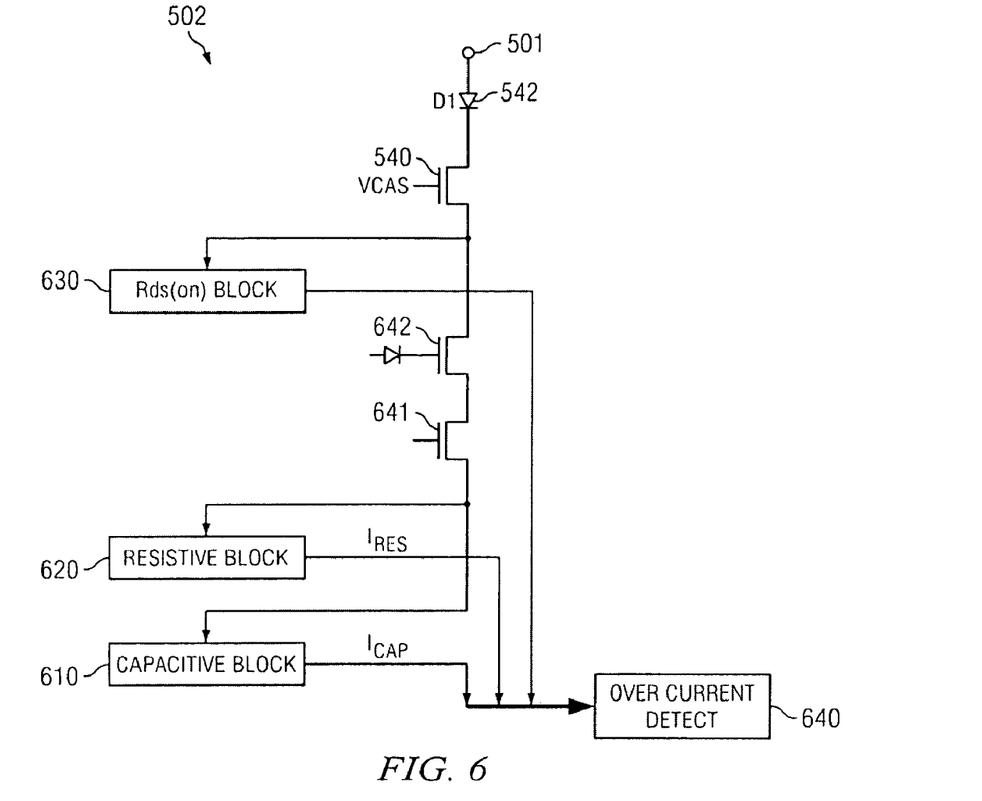
FIG. 6 is a block diagram of selected elements of an embodiment of a current driver suitable for use with the transceiver of FIG. 5.

Producing a spectrally limited transition is achieved, in some embodiments of transceiver 404, by employing a digitally controlled current driver 502. Referring to FIG. 6, selected elements of an implementation of current driver 502 are depicted. In the depicted implementation, current driver 502 includes a capacitive current block 610, a resistive current block 620, and a third block referred to herein as Rds(on) current block 630. Some embodiments of current driver 502 are operable to produce spectrally limited transitions of the shared bus voltage by drawing a precisely defined and time varying driver current 503 from shared bus node 501 where the driver current 503 approximates the current that a transceiver would have to sink if a single-frequency, sinusoidal waveform were applied to an RC model of shared bus 430.

Figure 7:
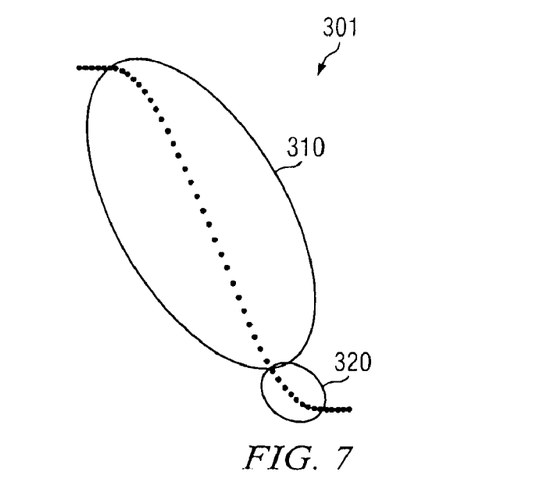
FIG. 7 illustrates regions of operation for the current driver blocks of FIG. 6 as a function of the wave form generated by the transceiver of FIG. 4.

In the embodiment of current driver 502 shown in FIG. 6, the capacitive current block 610 is operable to draw a current that approximates the current attributable to capacitive element(s) of the RC model while resistive current block 620 is operable to draw a current that approximates the current attributable to the resistive element(s) of the RC model. Rds (on) current block 630 is operable to approximate the signal transition at points in the transition where the voltage of shared bus 430 drops below a predetermined threshold. In this embodiment, the sinusoidal transition 301 as shown in FIG. 7 includes a first portion 310 in which the voltage of the shared bus is sufficiently above the threshold and a second portion 320 during which the voltage of the shared bus is below the threshold for resistive 620 and capacitive 610 current blocks operation. During the first portion 310 of transition 301, capacitive current block 610 and resistive current block 620 dominate the current sourcing while, during the second portion 320, current sourcing is dominated by Rds(on) block 630.

Figure 9:
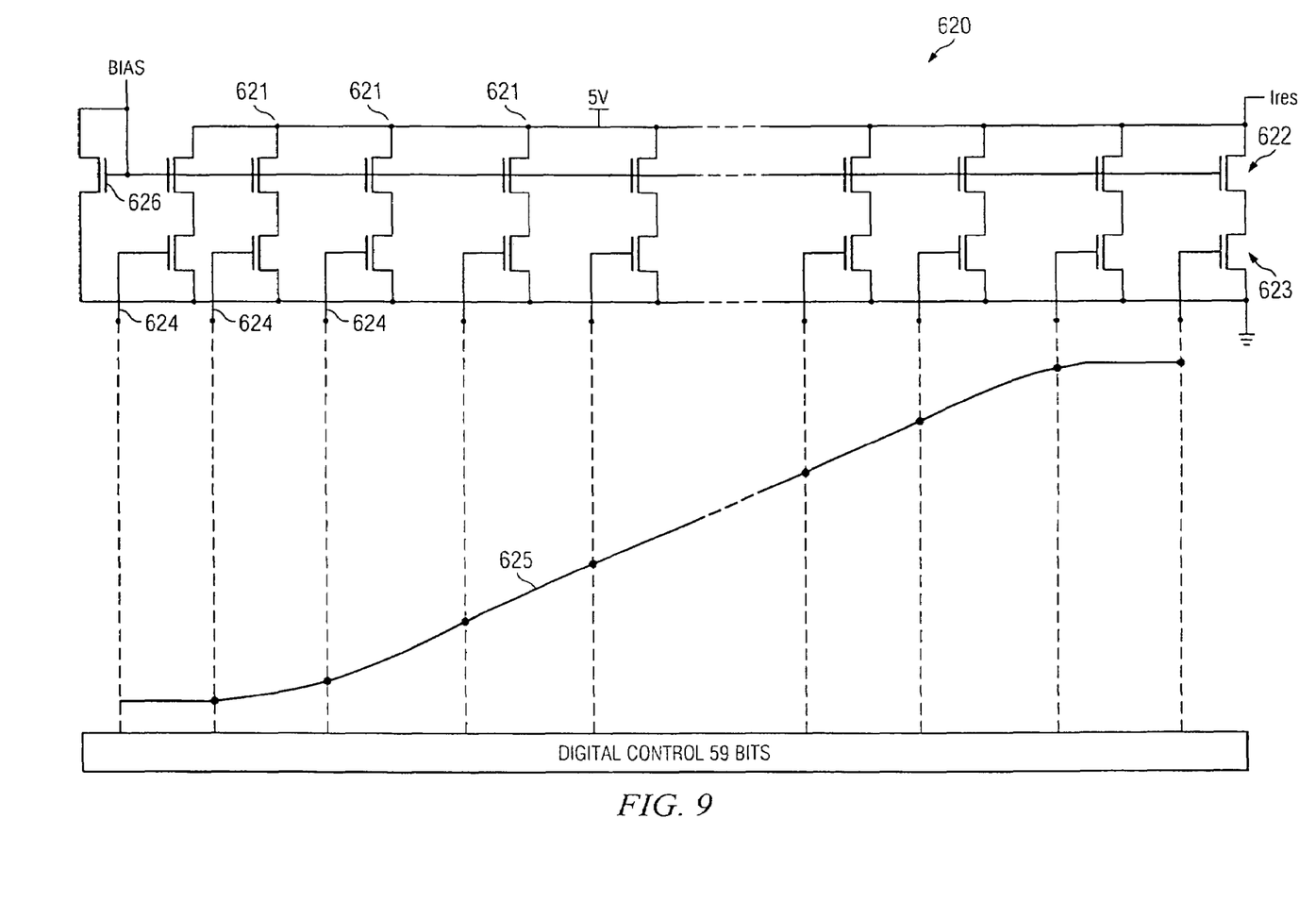
FIG. 9 illustrates selected elements of an embodiment of a resistive current block suitable for use with the current driver of FIG. 6.

Referring now to FIG. 9, an exemplary implementation of resistive current block 620 is depicted. In the depicted embodiment, resistive current block 620 includes multiple current mirror stages 621 where each stage 621 is activated by a control bit 624. Although the number of stages 621 is an implementation detail, an exemplary embodiment may include, for example, 59 stages. Each stage 621 includes an analog biased transistor 622 and a switching transistor 623. In this disclosure, transistors, whether bipolar or field effect, are referred as having a control terminal and two current carrying terminals or, more simply, current terminals. For bipolar transistors, the control terminal is the base terminal, the control signal is the base current, and the current terminals are the emitter and collector terminals. In the case of MOS and other field effect transistors, the control terminal is the gate terminal, the control signal is the gate voltage, and the current terminals are the source and drain terminals.

As depicted in FIG. 9, a BIAS signal is applied to the control terminals of analog biased transistors 622. The BIAS signal is generated by BIAS module 510 depicted in FIG. 5. The BIAS signal may be in the form of a BIAS current or a BIAS voltage depending upon the implementation. In the embodiment depicted in FIG. 9, the BIAS signal is a voltage signal applied to the control terminal of a reference transistor 626. The control gate of reference transistor 626 is connected to one of the current terminals of reference transistor 626.

In this configuration, reference transistor 626 functions as a voltage controlled current source. Varying the BIAS signal causes a variation in the current in each stage 621. The stages 621 are referred to as current mirror stages because the source/drain current that is produced by reference transistor 626 is reflected in source/drain currents of the analog biased transistors 622 when the corresponding switching transistor 623 is turn on. The ratio of the magnitude of the current in a analog biased transistor 622 to the magnitude of the current in reference transistor 626 is a function of the relative sizing of the two transistors.

The magnitude of the BIAS signal is determined based on one or more factors to facilitate the production of spectrally-limited transitions of the shared bus voltage. The current terminals analog biased transistors 622 are connected between a power supply node and a current terminal of a corresponding switching transistor 623. As depicted in FIG. 9, one of the current terminals of each switching transistor 623 is grounded and the control terminal 624 represents a digital bit that may be controlled by control logic 520 to turn on or off the corresponding switching transistor 623.

The current drawn by resistive current block 620 is referred to as Ires 625. A representation of Ires 625 as a function of time is presented below the illustration of current block 620. As each successive stage 621 is asserted in sequence, Ires 625 increases accordingly. Thus, for example, assertion of the control bit of a first stage 621 activates the first switching transistor 623, which causes the analog biased transistor 622 to conduct a source/drain current determined by the weighting of analog biased transistor 622 and the bias signal. Because the stages 621 are arranged in parallel, the currents drawn by each activated stage 621 are additive and Ires equals the sum of the currents in each stage 621.

As stated, the weighting of analog biased transistors 622 influences the relative contribution of each stage 621. The weighting may be controlled by using differently sized analog biased transistors 622. For example, the W/L ratios of analog biased transistors 622 may differ depending on the relative contribution desired for the corresponding stage 621. By manipulating the weighting of each stage 621, resistive current block 620 is operable to draw the resistive portion of the total current drawn from the shared bus when the shared bus exhibits the spectrally limited waveform 300 shown in FIG. 3. Because resistive current and voltage are linearly related by Ohms law, the graphical representation of Ires has the same sinusoidal shape as transitions 301 and 302 of waveform 300.

Figure 8:
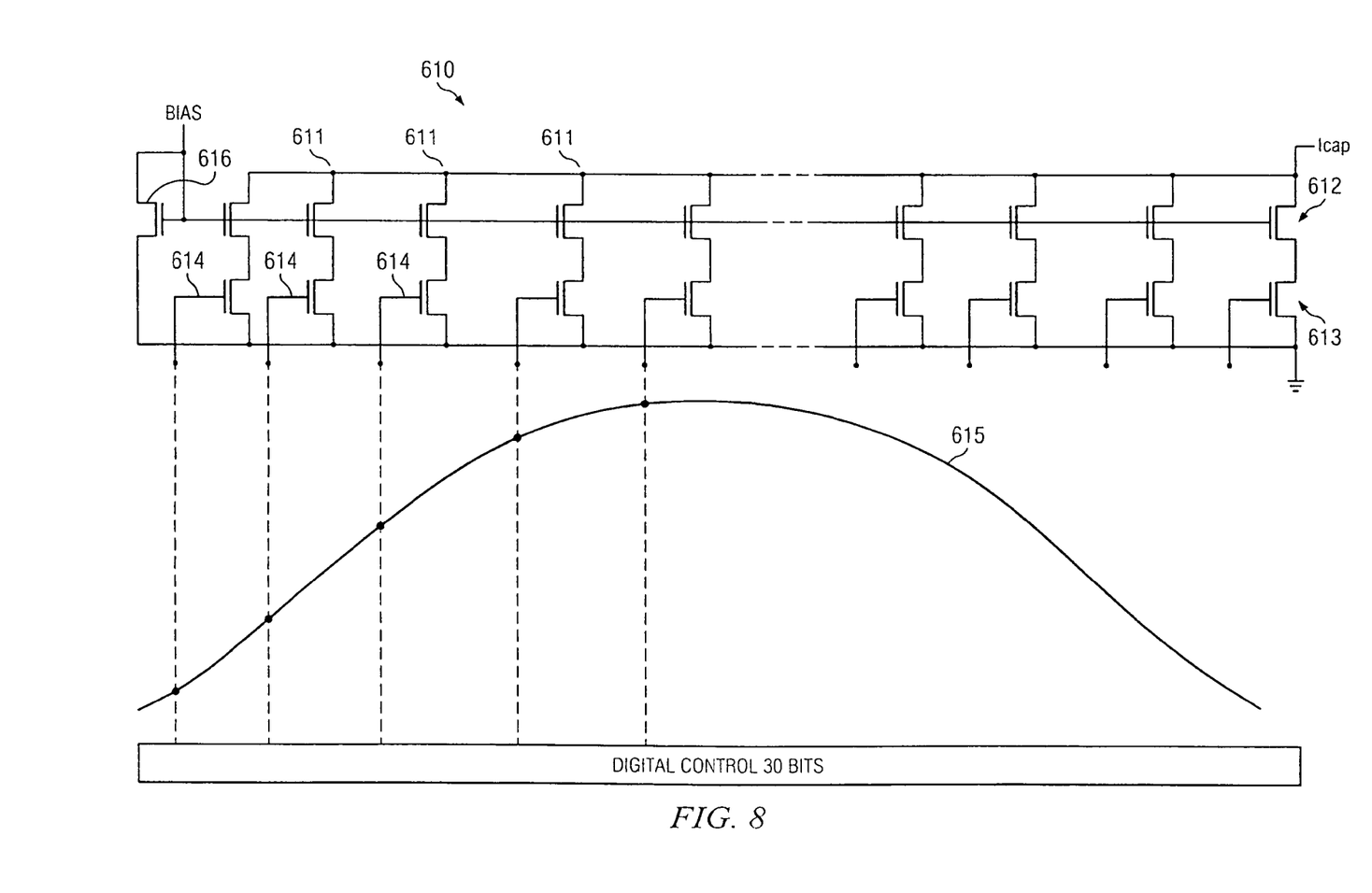
FIG. 8 illustrates selected elements of an embodiment of a capacitive current block suitable for use with the current driver of FIG. 6.

Referring now to FIG. 8, a representation of capacitive current block 610 of FIG. 6 is shown. Like resistive current block 620, capacitive current block 620 includes a reference transistor 616 and a plurality of current mirror stages 611. Capacitive current block 610 functions in a manner analogous to resistive current block 620 to produce a capacitive current, Icap 615. However, whereas Ires 625 increases monotonically throughout its stages, Icap 615, as shown in FIG. 8, increases to a maximum value and then decreases from the maximum value thereafter. Icap 615 as shown in FIG. 8 reflects the non-linear current/voltage characteristics of capacitors. Specifically, Icap 615 is proportional to the slope of waveform 300 because the current through a capacitor is proportional to the derivative of the capacitor's voltage curve.

To produce Icap 615 as shown, embodiments of capacitive current block 610 may take advantage of the symmetry of Icap 615 by using half as many stages 611 as resistive current block 620. For example, in embodiments where resistive current block 620 includes 59 stages 621, capacitive current block 610 may include 30 stages. The stages 621 of capacitive current block 620 have been sequentially activated to produce the maximum value of Icap 615, the stages may then be deactivated sequentially in the reverse order to decrease Icap 615 from its maximum value to zero.

Figure 10:
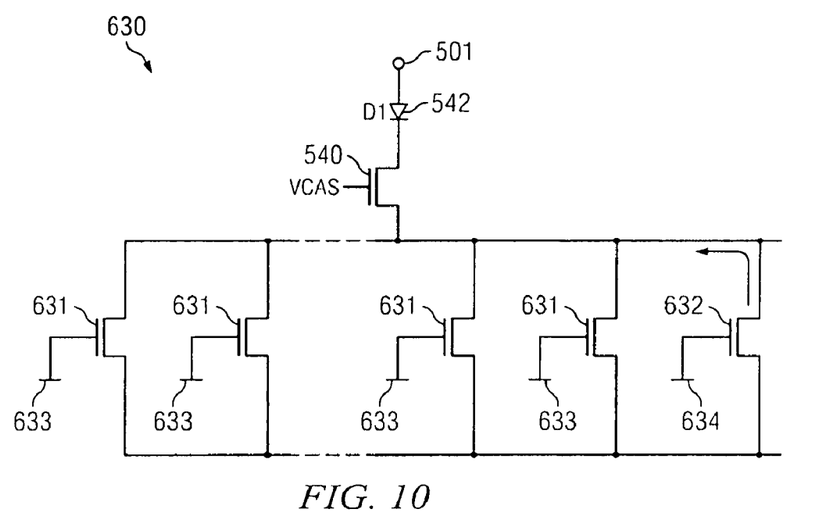
FIG. 10 illustrates selected elements of an embodiment of a third block, referred to herein as an Rds(on) block, suitable for use with the current driver of FIG. 6.

Referring now to FIG. 10, selected elements of an embodiment of Rds(on) block 630 are shown. Whereas capacitive current block 610 and resistive current block 620 employ current mirrors, each stage of Rds(on) block 630 is implemented with a single-transistor switch 631. The control terminals 633 represent control bits that may be manipulated by control logic 520. When the shared bus voltage, VLIN, is low, transistor 631 and 632 functions as voltage controlled resistor having a resistance, Rds, determined by their size and the gate electrode voltage.

Returning now to FIG. 5, elements of the depicted transceiver 404 that support current driver 502 are described. Transceiver 404 is operable to adjust the bias signal applied to the current driver 502 based on factors including, as an example, the slew time of the shared bus. As depicted in FIG. 5, transceiver 404 includes a slew time module 514, a convergence logic 512, and a bias module 510.

Slew time module 514 is connected to the shared bus 430 through a low pass filter element 545. Slew time module 514 is operable to determine the rate of change of VLIN during signal transitions. Slew time module 514 as shown produces two outputs identified as a 70% output and a 40% output. Slew time module 514 asserts 70% output when VLIN drops below a value that is 70% of its maximum value, which is approximately 70% of VBAT. Similarly slew time module 514 asserts 40% output when VLIN drops below a value that is 40% of its maximum value. By asserting two signals based on two different points in the transition of VLIN, slew time module provides information indicative of the rate at which VLIN changes during signal transitions can be determined. Although FIG. 5 depicts slew time module 514 as producing two distinct outputs, other embodiments may provide the same information via a single output, for example, by pulsing the output at the 70% point and pulsing the output a second time at the 40% point. Moreover, although the described embodiment uses 70% and 40% as the measuring points for slew time determination, these values are implementation specific and other values may be used. In some embodiments, the triggering levels for slew time module 514 may be user selectable, for example, via programmable registers (not shown) within transceiver 404.

Convergence logic 512 receives inputs from slew time module 514 and produces an output that is indicative of the slew time. Convergence logic 512 may include, as an example, a counter circuit that receives a clock signal from oscillator 530. The counter circuit may be triggered by the outputs from slew time module 514 so that, for example, the counter circuit is operable to count the number of clock cycles that occur between assertion of the 70% signal and the 40% signal. The number of clock cycles counted thus provided a digital approximation of the slew time. Transceiver 404 is operable to adjust the "strength" of current driver 502 to achieve a desired slew time.

Figure 11:
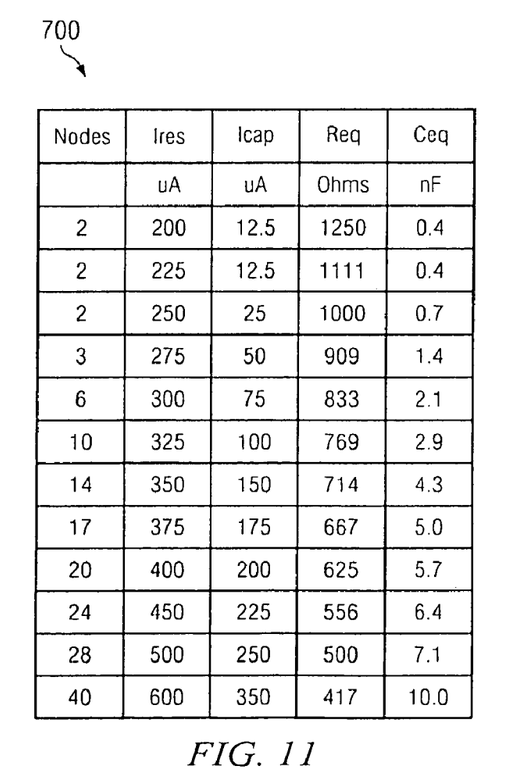
FIG. 11 is an exemplary table for determining a biasing condition(s) for the current driver blocks of FIG. 6.

To achieve the desired slew time control, transceiver 404 includes a bias module 404 that receives digital slew time information from convergence logic 512 and produces an analog bias signal 515 that is provided to the current driver 502. As illustrated above with respect to FIG. 8 and FIG. 9, BIAS signal influences the amount of current drawn by resistive current block 620 and capacitive current block 610. In some embodiments, bias module 510 is implemented with one or more lookup tables, an example of which is shown in FIG. 11. As depicted in FIG. 11, an exemplary table 700 includes approximations of equivalent resistances and capacitances for different configurations of the shared bus including, for example, how many nodes are attached to the shared bus. From the slew time information, bias module can use the lookup table information to obtain an appropriate bias signal. In some embodiments, bias module 510 generates a first bias signal for capacitive current block 610 and a second bias signal for resistive current block 620. The bias signal may be a bias current when resistive current block 620 and capacitive current block 610 have current mirror circuits.

Figure 12:
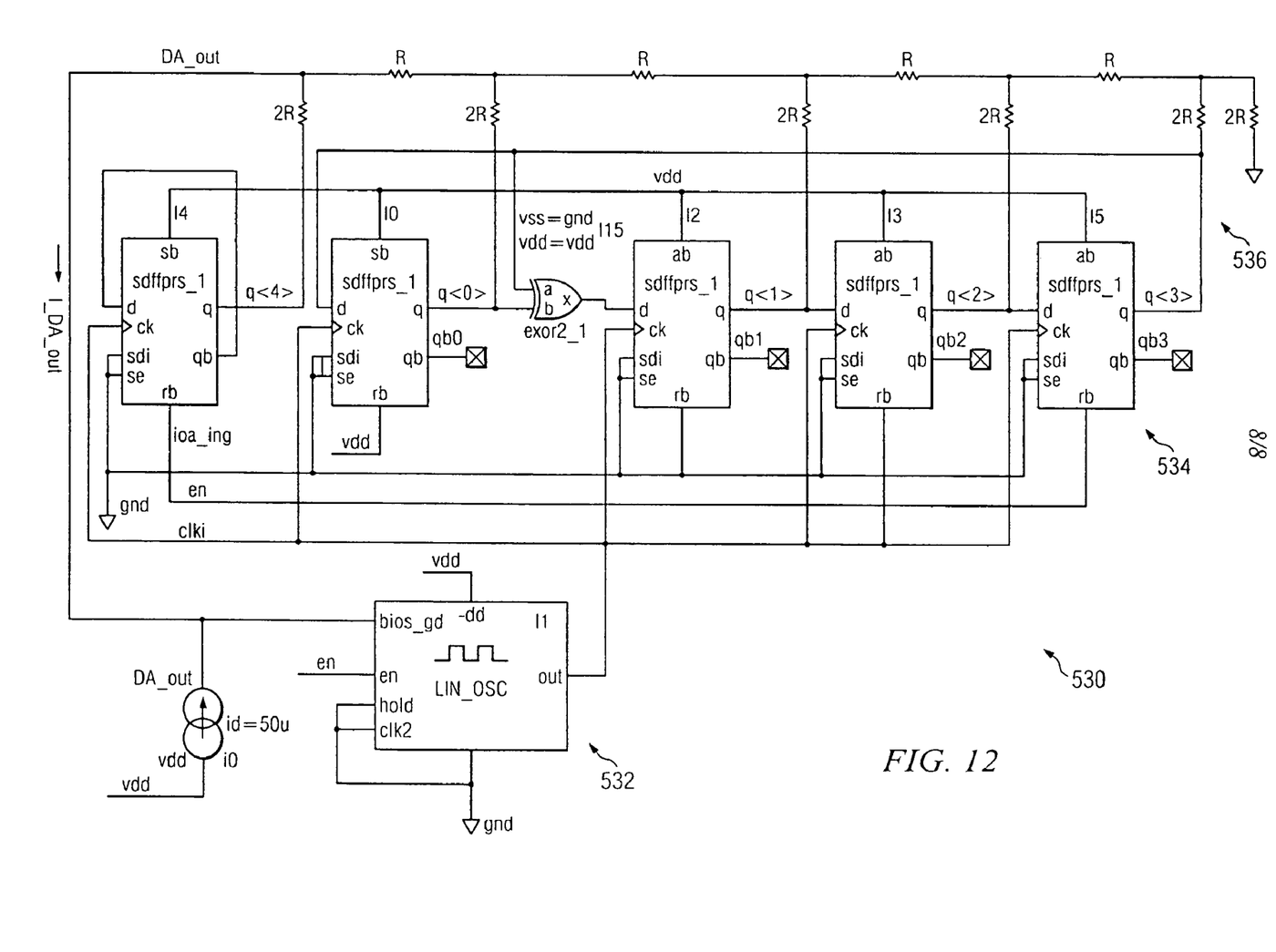
FIG. 12 depicts selected elements of an embodiment of a spread spectrum oscillator suitable for use as an oscillator in the network of FIG. 5.

To reduce the amount of emitted RF produced by transceiver 404, some embodiments employ a variable frequency or spread spectrum oscillator to provide a clocking signal to convergence logic 512 and control logic 520. Referring to FIG. 12, an exemplary embodiment of a spread spectrum oscillator 530 is shown. The depicted oscillator includes a voltage controlled oscillator (VCO) 532, a pseudo random generator 534, and a D/A converter 536. The pseudo random generator 534 may be configured to produce a sequence of digital values from 0 to N where N is greater than 1 and, in some embodiments, is equal to 30 or so. The sequence is chosen to keep the timing average constant around the original clock period in order to avoid distortion in the shared bus wave form. The output of the pseudo random generator is applied to a resistive D/A converter to produce a current and voltage that vary with the sequence value. The output of the D/A converter is supplied to the input of the VCO. The output of the VCO is the clock signal that drives the clocking of control logic 520 and convergence logic 512.

Although the invention is described herein with reference to specific embodiments, various modifications and changes can be made without departing from the scope of the present invention as set forth in the claims below. For example, whereas the current mirrors in the described embodiment were illustrated as being implemented with bipolar transistors, other embodiments may employ MOS transistors. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A transceiver suitable for interfacing a logic device to a shared bus, the transceiver comprising:
   a transmit node suitable for receiving an input signal from the logic device;
   a shared bus node suitable for connecting to the shared bus;
   control logic coupled to the transmit node and operable to assert a current driver enable signal in response to detecting an assertion of the input signal; and
   a current driver operable to draw a time varying driver current from the shared bus node in response to detecting an assertion of the current driver enable signal, the driver current producing a wave shaped transition of the shared bus voltage, wherein the wave shaped transition approximates at least a portion of a sinusoidal signal;
   wherein the driver current includes a resistive component approximating a current attributable to a characteristic resistance of the shared bus and a capacitive component approximating a current attributable to a characteristic capacitance of the shared bus; and
   wherein the current driver includes a resistive block operable to draw the resistive component of the driver current and a capacitive block operable to draw the capacitive component of the driver current.

2. The transceiver of claim 1, wherein:
   the resistive block and the capacitive block each include a plurality of current mirrors arranged in parallel, at least some of the current mirrors including a reference transistor and an analog biased transistors configured to draw a reference current through analog biased transistor current terminals and a switching transistor having a control terminal and switching transistor current terminals, the switching transistor current terminals arranged in series with the analog biased transistor current terminals; and
   the control logic is operable to assert the current mirror control terminals according to a prescribed timing to simulate the resistive component with the current mirrors of the resistive block and to simulate the capacitive component with the current mirrors in the capacitive block.

3. The transceiver of claim 2, wherein the control logic is operable to:
   assert the control terminals of the resistive block sequentially from a beginning of the transition to the end of the transition; and
   assert the control terminals of the capacitive block sequentially from a beginning of the transition to approximately the middle of the transition and to de-assert the controls pins sequentially from approximately the middle of the transition to the end of the transition.

4. The transceiver of claim 2, wherein sizes of the analog biased transistors vary to produce varying output currents in at least some of the current mirrors.

5. The transceiver of claim 1, further comprising a third block operable to draw driver current when a magnitude of the shared bus voltage drops below a predetermined threshold.

6. The transceiver of claim 5, wherein the third block comprises a plurality of transistor switches arranged with their current terminals in parallel, wherein each of the transistor switches is coupled to the LIN node and further wherein the control logic is operable to assert control terminals of the transistor switches in a prescribed manner.

7. A transceiver suitable for interfacing a logic device to a shared bus, the transceiver comprising:
   a transmit node suitable for receiving an input signal from the logic device;
   a shared bus node suitable for connecting to the shared bus;
   control logic coupled to the transmit node and operable to assert a current driver enable signal in response to detecting an assertion of the input signal; and
   a current driver operable to draw a time varying driver current from the shared bus node in response to detecting an assertion of the current driver enable signal, the driver current producing a wave shaped transition of the shared bus voltage, wherein the wave shaped transition approximates at least a portion of a sinusoidal signal;
   a bias module operable to provide a bias signal to the current driver wherein the bias signal determines, at least in part, a magnitude of the driver current;
   a slew time module operable to generate at least one slew signal indicative of a slew time of the transition; and
   convergence logic operable to signal the bias module to adjust the bias signal when the slew time differs from a specified value or range of values.

8. The transceiver of claim 7, wherein the transceiver is operable for use with a shared bus having a single master, multiple slave architecture.

9. The transceiver of claim 7, where the shared bus is a Local Interconnect Network (LIN) compliant transceiver.

10. A current driver suitable for use in a transceiver coupled to a shared bus having a characteristic impedance including a characteristic resistance and a characteristic capacitance, the current driver being coupled to an I/O node suitable for connecting to the shared bus, the current driver being operable to draw a driver current from the I/O node to produce a transition of the shared bus voltage, wherein the transition approximates a portion of a sinusoidal signal, the current driver comprising:
   a resistive block operable to draw a resistive component of the driver current, wherein the resistive component approximates a current attributable to the characteristic resistance were the sinusoidal signal applied to the shared bus; and a capacitive block operable to draw a capacitive component of the driver current, wherein the resistive component approximates a current attributable to the characteristic capacitance were the sinusoidal signal applied to the shared bus.

11. The current driver of claim 10, wherein at least one of the resistive block and the capacitive block comprises a plurality of individually controllable current sources arranged in parallel wherein a current terminal of the current sources is coupled to the I/O node.

12. The current driver of claim 11, wherein the current sources comprise current mirrors including a reference transistor, analog biased transistors and switching transistors.

13. The current driver of claim 10, further comprising a third block operable to draw a third component of the driver current.

14. The current driver of claim 13, wherein the third component is substantial relative to a sum of the resistive and capacitive components when a magnitude of the shared bus voltage is less than a predetermined threshold.

15. The current driver of claim 14, wherein the third block comprises a plurality of transistor switches arranged in parallel.

* * * * *